Patented Dec. 7, 1937

2,101,664

UNITED STATES PATENT OFFICE 2,101,664

DIAZO SALT PREPARATIONS

Max Wyler, Blackley, Manchester, England, assignor to Imperial Chemical Industries Limited, a corporation of Great Britain No Drawing. Application December 17, 1935, Serial No. 54,949. In Great Britain December 22, 1934

4 Claims. (Cl. 260—69)

This invention relates to new solid diazo salts and the process of their production.

The invention has as an object the formation of solid diazo salts which, by virtue of their good solubility, stability and coupling power, are valuable for application in certain dyeing and printing processes, for example, the so-called "ice-color" process.

Various aromatic sulphonic acids have been applied in the making of solid stable diazo salts. The sulphonic acids hitherto technically useful for this purpose are limited in number and do not always yield stable diazo salts which are readily isolated or which have satisfactory stability or solubility with all the diazotized amines it is desired to use commercially in such a stable, solid form. I have now found a means whereby desirable, new, well crystallized, solid, stable diazo salts may be obtained.

The invention comprises interacting an aqueous solution containing a diazotized aromatic amine devoid of sulphonic or carboxylic groups with anisol-4-sulphonic acid, or mixtures of sulphonic acids, having as main constituent anisol-4-sulphonic acid (see Gnehm and Knecht; J. für Praktische Chemie., 1906, 74, page 103), such as are obtained by sulphonating anisol with concentrated sulphuric acid, or the water-soluble salts of the said acid or mixtures of acids. By this means well crystallized salts, namely diazonium anisol sulphonates are formed. The present invention is particularly applicable to those diazotized aromatic amines which are used in "ice color" processes such as, for example, dianisidine, 2:5-dichloroaniline, 4-chloro-2-toluidine and 4-nitro-2-toluidine. Diazotized amines which already contain an azo group, for example, aminoazotoluene (from o-toluidine) have been applied in "ice-color" processes and may also be used in the present invention.

Various ways of carrying the invention into effect will be clear to the skilled technician. For example, the unsulphonated substituted amine is dissolved or suspended in a quantity of a suitable mineral acid of correct concentration to facilitate diazotization. Nitrous acid or a substance capable of generating nitrous acid in such an acid medium is added, while the factors of temperature, agitation, and rate of addition are controlled to secure diazotization. These steps are well understood in the art. To the solution of diazonium salt thus resulting is added, with proper control of temperature, agitation, and rate of addition: (1) a sufficient quantity of a solid sulphonic acid as hereinbefore defined to precipitate the diazo salt; or (2) a like quantity of a suitable solid metal salt of the said sulphonic acid as above described; or (3) a like quantity of an aqueous solution of the said sulphonic acid as above described; or (4) a like quantity of an aqueous solution of a suitable metal salt of the said sulphonic acid as above described. The solid diazo salt which thus results is filtered off and dried under conditions which will not cause its decomposition.

Obviously, when desirable, the diazo salts may alternatively be formed by diazotizing the amine in an aqueous solution containing the required amount of a sulphonic acid or a salt thereof as defined above.

The new diazo salts formed as described above are readily isolated in good yields. They can be dried without decomposing at moderately raised temperatures (for instance from 50° C. to 60° C.) to give crystalline powders varying from white to brown in color. In the solid form and at ordinary temperatures they are stable for indefinite periods of time and darken only slowly on exposure to strong daylight. In most cases they dissolve in warm methanol from which beautiful crystallizations can be effected. The new stable diazo salts dissolve readily in water and are very suitable for use in the coloring of textile fabrics by "ice-color" processes.

The new salts may be applied to the fabric by any of the methods commonly employed in the dyeing and printing arts. For example, cotton yarn may be impregnated with the anilide of 2-hydroxy-2-naphthoic acid by immersion in a water solution of the sodium salt of this compound. This impregnated yarn is then placed in a solution of one of these diazo salts when the color is immediately produced on the fibre. In the printing art, cotton piece goods is impregnated with an arylide of 2-hydroxy-3-naphthoic acid, dried and subsequently printed with a prepared paste of one of these diazo salts. The color is then developed in the usual manner and the excess of the arylide removed by washing.

It will be understood that, in employing the solid salts described herein, in order to meet the particular conditions or requisites of a given dyeing or printing operation, it may be advisable to add to the salt preparation any of the well known substances ordinarily employed in this art, such as, for example, sodium chloride, sodium sulphate, sodium bicarbonate, aluminium sulphate, or potassium aluminium sulphate, or a mixture of these salts.

To illustrate the invention the following examples, in which the parts are by weight, are given. It is to be understood that the invention is not limited to the specific reagents, proportions or operating conditions therein disclosed.

Example 1

To 1000 parts of an aqueous solution of diazotized p-nitroaniline, obtained by diazotizing 138 parts of p-nitroaniline in the usual way, is added the diluted sulphonation mixture from 118 parts of anisol. The new stable diazo salt so formed precipitates in the form of bright yellow crystals. The precipitation of the diazo salt is completed by the addition of common salt. The suspension is filtered and the precipitate washed a little with saturated brine and dried at 50°. The new stable diazo salt forms a yellow crystalline power which dissolves in cold water with great ease.

The diluted sulphonation mixture used in the above example is prepared as follows:

118 parts of anisol are gradually added to 165 parts of sulphuric acid monohydrate. The sulphonation mixture is stirred at 100° C. for 4 hours and then poured into 500 parts of ice and water. The diluted sulphonation mixture so obtained may be used directly in the above example but it is preferable to neutralize the large excess of sulphuric acid by the addition of caustic soda before mixing with the diazotized p-nitroaniline.

Example 2

If instead of the 138 parts of p-nitroaniline used in Example 1, 141.5 parts of 5-chlor-2-toluidine are used, a solid diazo salt of 5-chlor-2-toluidine is obtained in the form of pale cream colored crystals, which are stable and dissolve readily in water.

Example 3

If 168 parts of 5-nitro-2-anisidine are used instead of the 138 parts of p-nitroaniline in Example 1 a solid diazo salt in the form of light yellow crystals is obtained. This new diazo salt of 5-nitro-2-anisidine is very stable and also readily soluble in water.

As many apparently widely different embodiments of this invention may be made without departing from the spirit and scope thereof, it is to be understood that I do not limit myself to the specific embodiment thereof except as defined in the appended claims.

I claim:

1. The compound represented by the formula:

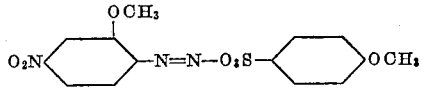

2. The compound represented by the formula:

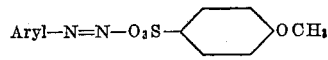

3. The compound represented by the formula:

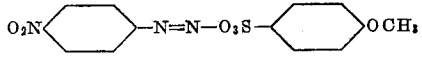

being a yellow crystalline powder soluble in cold water.

4. The compound represented by the formula:

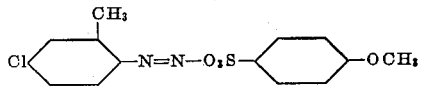

being pale cream colored crystals soluble in water.

MAX WYLER.